(12) United States Patent
Butterworth

(10) Patent No.: US 7,088,917 B2
(45) Date of Patent: Aug. 8, 2006

(54) BUBBLE MACRO MODE LENS

(75) Inventor: Mark M. Butterworth, Santa Clara, CA (US)

(73) Assignee: Avago Technologies General IP (Singapore) Pte. Ltd. (SG)

( * ) Notice: Subject to any disclaimer, the term of this patent is extended or adjusted under 35 U.S.C. 154(b) by 120 days.

(21) Appl. No.: 10/853,997

(22) Filed: May 26, 2004

(65) Prior Publication Data

US 2005/0265715 A1    Dec. 1, 2005

(51) Int. Cl.
*G03B 3/00* (2006.01)
*G03B 13/32* (2006.01)
*G02B 3/12* (2006.01)
*G02B 3/14* (2006.01)

(52) U.S. Cl. .................. 396/89; 396/72; 348/345; 359/665

(58) Field of Classification Search ............. 359/665, 359/667, 228, 666; 396/72, 89, 111; 348/240.3, 348/335, 345
See application file for complete search history.

(56) References Cited

U.S. PATENT DOCUMENTS

| | | | | |
|---|---|---|---|---|
| 4,536,061 A | * | 8/1985 | Nishimura | 359/242 |
| 4,615,580 A | * | 10/1986 | Mayer | 385/19 |
| 5,066,301 A | * | 11/1991 | Wiley | 623/6.13 |
| 5,443,506 A | * | 8/1995 | Garabet | 623/6.13 |
| 6,904,192 B1 | | 6/2005 | Schroeder et al. | |
| 2004/0227838 A1 | * | 11/2004 | Atarashi et al. | 348/340 |

* cited by examiner

*Primary Examiner*—W. B. Perkey
*Assistant Examiner*—Rishi Suthar

(57) ABSTRACT

A lens system has an optical path through a lens that is in contact with a liquid. The focal length of the lens system can be changed through introduction of a bubble in the optical path at the lens-liquid interface. The bubble changes the refractive index difference at the lens surface and thereby changes the focal length of the lens system. In a camera, the lens system can operate in a macro mode corresponding to a shorter focal length or a normal mode corresponding to a longer focal length.

12 Claims, 2 Drawing Sheets

BUBBLE MACRO MODE LENS

BACKGROUND

Photographers often want to take close-up photographs of small objects. This is commonly referred to as "macro" photography and generally involves taking photographs of objects that may be less than a few inches from the camera. In contrast, "normal" photography generally involves taking a photograph of relatively large objects such as landscapes or people that are no closer than several feet away from the camera. Designing a camera lens capable of both normal and macro photography can be difficult because of the range of focus and light collection capabilities required for acceptable image quality.

Expensive cameras typically have lens mounts that permit a photographer to change lenses as required for the type of photography being done. Alternatively, an additional lens element could be added to a fixed lens system. A magnifier, for example, can be added in front of the normal lens of a camera for macro photography. A drawback of these types of cameras is the need to have separate lenses or lens elements, which may be inconvenient for a casual photographer and/or undesirable for compact cameras. Another alternative is to provide a camera with a mechanical system that can shift an additional lens element into or out of the optical path of the camera for different types of photography. Such mechanical systems generally have moving parts that can add to the cost and complexity of a camera and may be an additional reliability concern.

A lens system that is capable of both normal and macro photography is thus desired that is suitable for inexpensive and compact cameras.

SUMMARY

In accordance with an aspect of the invention, a lens system contains a liquid in the optical path of the lens system. Through creation or movement of a bubble adjacent to a lens surface, the lens system can be changed, for example, from a normal mode providing a longer focal length for normal photography to a macro mode providing a shorter focal length for macro photography.

One specific embodiment of the invention is an optical system including a first optical element, a second optical element, a liquid, and a control system. The liquid is generally in a gap between the first and second optical elements. The control system is operable in a first mode and a second mode. In the first mode, the liquid is in an optical path through the first and second optical elements, and in the second mode, a bubble is in the optical path. Either optical element can have a convex or concave side in contact with the liquid. The optical system is particularly suited for a camera lens, where one of the modes is for macro photography and the other mode is for normal photography.

One implementation of the control system includes a heating element, and the control system switches between the first mode and the second mode by controlling a current through the heating element. Another implementation of the control system switches between the first and second modes by moving the bubble into or out of the optical path.

Another specific embodiment of the invention is a method for operating an optical system that includes a first optical element, a second optical element, and a liquid between the first optical element and the second optical element. The method includes: forming a first image using an optical path through the first optical element, the liquid, and the second optical element; and forming a second image using an optical path through the first optical element, a bubble in the liquid, and the second optical element. The bubble in the liquid can be created or controlled using a variety of techniques. For example, the liquid can be heated to create the bubble in the optical path for the second image. Alternatively, the bubble can be moved into the optical path for the second image.

BRIEF DESCRIPTION OF THE DRAWINGS

Use of the same reference symbols in different figures indicates similar or identical items.

DETAILED DESCRIPTION

In accordance with an aspect of the present invention, a lens system switches between a first focal length and a second focal length through control of a bubble in a liquid layer that is between optical surfaces. The lens system can be used in a camera, where the shorter focal length corresponds to a macro photography mode of the camera and the longer focal length corresponds to a normal photography mode of the camera. The change between the camera modes can be achieved without requiring a removable lens and without a complicated mechanical system. Further, the lens system can be easily fabricated at size scales associated with digital camera integrated circuits.

Figure 1:
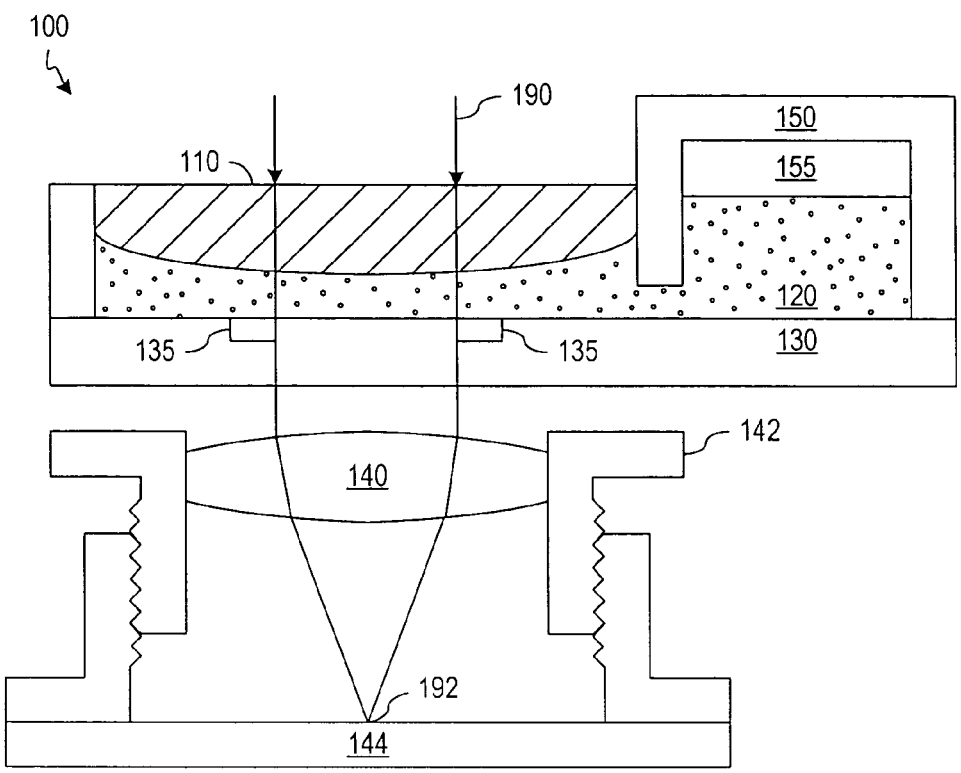
FIG. 1 shows a cross-sectional view of a camera with a lens system in accordance with an embodiment of the invention in a mode where a fluid is in the optical path of camera.

FIG. 1 shows a camera 100 in accordance with an embodiment of the invention including a transparent liquid 120 that is between the optical surfaces of two elements 110 and 130. In the illustrated embodiment, element 110 is a plano-convex lens having a convex surface in contact with liquid 120, and element 130 is a plate having a planar surface in contact with liquid 120. More generally, in alternative embodiments, at least one of the surfaces of elements 110 and 130 that are in contact with liquid 120 should be concave or convex to permit focal length changes as described further below.

Parallel rays 190, which are perpendicular to the planar surface of lens 110, illustrate an optical path through lens 110, liquid 120, and plate 130 and show a focal point 192 of a lens system including lens 110, liquid 120, plate 130, and an additional lens element 140. Additional lens elements 140 can be part of a camera lens of conventional design including a mounting 142 that permits movement of lens 140 for focusing. The focal point 192 of the lens system is on an image plane 144 when camera 100 is focused on an object that is a long distance from camera 100 (e.g., an object at infinity). In a camera, image plane 144 includes film (not shown) or an electronic image sensor (not shown) such as a CCD image sensor or a CMOS image sensor to capture an image formed on image plane 144. Other conventional camera elements such as a shutter system, an adjustable aperture, and electrical circuits for digital image capture are not shown in FIG. 1 but are well known in the art and may be included in some embodiments of the invention.

In the illustrated embodiment of FIG. 1, liquid 120 has a refractive index that matches the refractive index of lens 110, causing the combination of lens 110 and liquid 120 to act as a plate with parallel sides. The focal point of the lens system of camera 100 is therefore the focal point of lens 140 when liquid 120 is an index matching fluid for elements 110 and 130. More generally, liquid 120 has a refractive index greater than 1 and therefore increases the effective focal length of plano-convex lens 110, relative to when lens 110 is surrounded by air.

Figure 2:
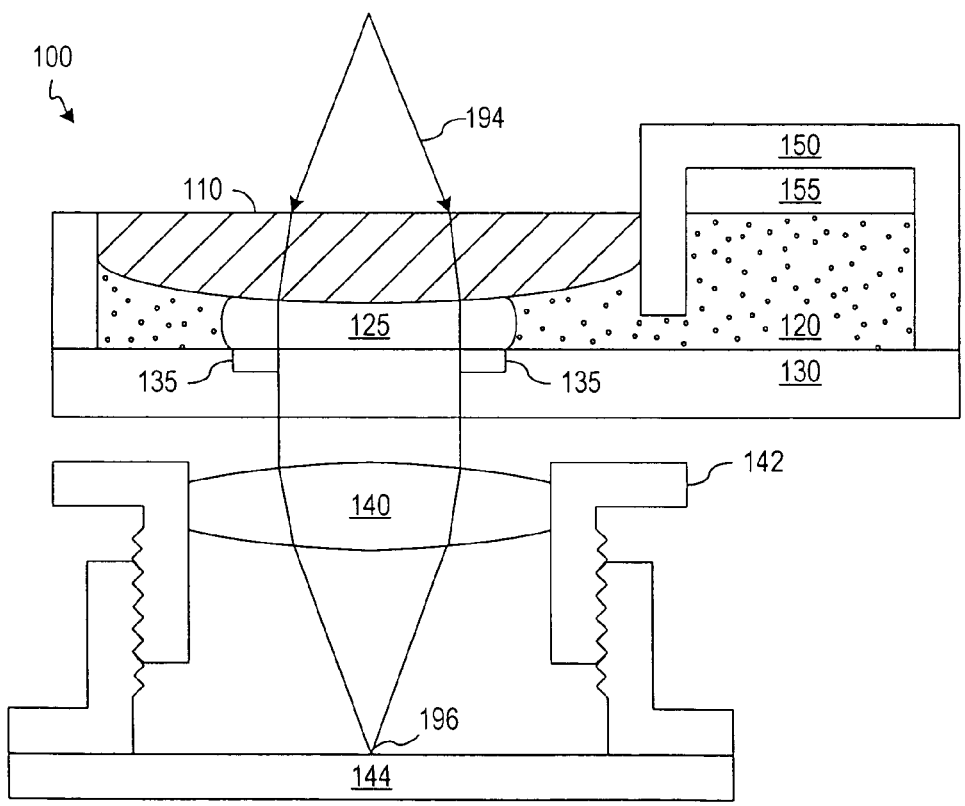
FIG. 2 shows a cross-sectional view of the camera of FIG. 1 in a mode where a bubble is in the optical path.

FIG. 2 shows camera 100 after a bubble 125 or air gap in liquid 120 is created in or moved into the optical path of the lens system. FIG. 2 shows that bubble 125 in the optical path causes plano-convex lens 110 to act as a magnifying lens that shortens the focal length of lens system. Light rays 194 originating from an object close to lens 110 thus focus at a point 196 on image plane 144. Accordingly, FIG. 2 can correspond to a macro photography mode of camera 100, while FIG. 1 corresponds to a normal photography mode of camera 100.

In an exemplary embodiment of the invention, the focus distance of the lens system in camera 100 is about 50 mm in the macro mode and greater than about 300 mm in the normal mode. These focus distances can be when lens 140 has a focus distance of about 300 mm or more, lens 110 has a focal length of about 5 mm, and liquid 120 has a refractive index that is about the same as the refractive index of lens 110. For example, when lens 110 is made of an optical quality glass such as BK7 having a refractive index of about 1.52, liquid 120 can be oil, which similarly has a refractive index of about 1.52.

A variety of techniques can create or place bubble 125 in the optical path. The technique illustrated in FIG. 2 uses an electrical heating element or resistor 135 that can be formed in or on plate 130 or lens 110. For example, a material such as TiN can be deposited on plate 130 and patterned to create a ring-shaped heating element or resistor 135. A current through resistor 135 generates heat that causes formation of a vapor bubble in liquid 120 adjacent to resistor 140.

Liquid 120 in the gap between lens 110 and plate 130 is in fluid communication with a reservoir 150 containing a gas cushion 155 that allows creation of bubble 125 without a large increase in the fluid pressure of liquid 120. Bubble 125 will generally remain stable at a size such that the pressure in liquid 120 and the surface tension of bubble 125 balances the internal pressure in bubble 125. Bubble 125 can be confined to the desired location adjacent to lens 110 through use of relatively narrow apertures for fluid flow away from the gap between lens 110 and plate 130.

In one embodiment, heating creates bubble 125, and the pressure and temperature of liquid 120 are maintained at levels such that continuous heating is required to prevent bubble 125 from collapsing. If desired, the current through resistor 135 can be reduced to maintain bubble 125 after initial creation. In this embodiment, resistor 135 creates a temperature gradient that confines bubble 125 to the area adjacent resistor 135 since portions of the bubble outside the area where resistor 135 applies heat collapse. When current through resistor 135 is turned off, bubble 125 collapses, and the lens system of camera 100 automatically switches back to the lens mode illustrated in FIG. 1.

Figure 3:
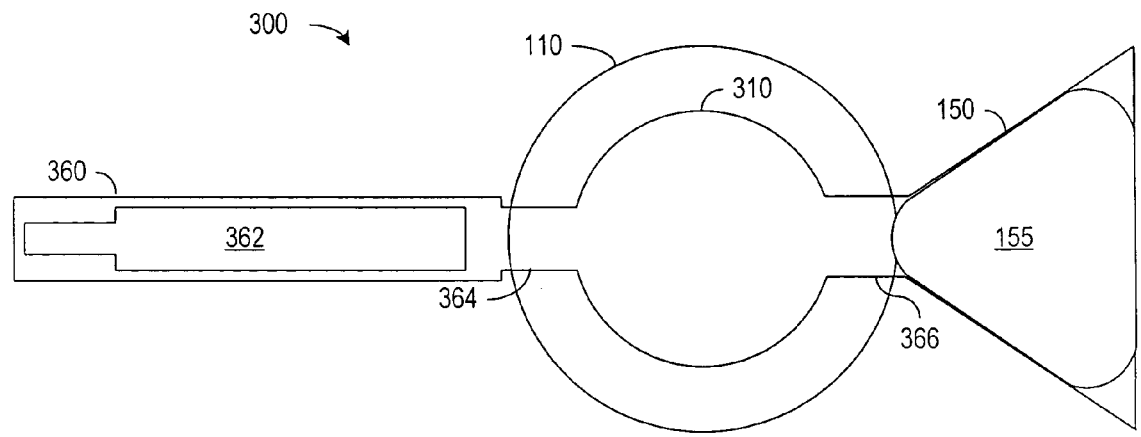
FIG. 3 is a plan view of a lens system in accordance with an embodiment of the invention that is capable of changing focal length through movement of a bubble.

Instead of creating bubble 125 in the optical path, bubble 125 can alternatively be moved into and out of the optical path to change the lens mode of camera 100. FIG. 3 shows a plan view of an embodiment of the invention in which a cavity 310 that is between optical elements 110 and 130 can either be filled with a liquid 120 or contain a bubble 125. Cavity 310 is in fluid communication with an activation cavity 360 and reservoir 150. Cavity 310 preferably has a minimum dimension that is large enough to allow a stable bubble to remain in cavity 310 at the operational temperature and pressure of liquid 120. Activation cavity 360 contains a heating element 362, and the height, width, or other minimum dimension of activation cavity 360 is preferably too small to allow a stable bubble in activation cavity 360 unless heating element 362 is activated.

Activation cavity 360 is used to move a bubble into or out of cavity 310. To move a bubble into cavity 310, heating element 362 is activated with sufficient power and with sufficient duration to create a bubble that extends from activation cavity 360 into cavity 310. The bubble from activation cavity 360 can thus expand into cavity 310 while heating element 362 is active. Heating element 362 is turned off when the bubble in cavity 310 reaches the desired size. The bubble in activation cavity 360 collapses when heating stops, but a stable bubble remains in cavity 310. Necks 364 and 366 in the fluid paths leading out of cavity 310 have minimum dimensions that are too small to allow the bubble to extend significantly into either neck 364 or 366 at the nominal liquid pressure and temperature.

A fluid flow from activation cavity 360 can be used to push the bubble out of cavity 310. To move a bubble out of cavity 310, heating element 362 is rapidly activated so that an expanding bubble in cavity 360 pushes liquid 120 out of activation cavity 360 into cavity 310. A relative size of cavities 310 and 360 are such that the fluid flow from activation cavity 360 is able to push a bubble from cavity 310 through neck 366 into reservoir 150, where the bubble is absorbed into gas cushion 155.

In an exemplary embodiment of the invention, cavity 310 has a diameter of about 500 µm and a minimum height of about 45 µm. Activation cavity 360 has a volume greater than cavity 310 but a narrow width of about 12 µm. Each neck 364 or 366 is preferably about 10 µm long, 9 µm wide, and 45 µm high.

U.S. Patent Publication No. 2004/0067012, entitled "Latching Bubble For Fluid-Based Optical Switch", which is hereby incorporated by reference in its entirety, describes some structures and techniques for movement or control of bubbles in optical switches that could also be applied to lens systems as described here.

In yet another variation of the invention, liquid 120 can be mechanically drained from the gap between lens 110 and plate 130 to switch camera 100 from the mode of FIG. 1 to the mode of FIG. 2. Refilling the gap between lens 110 and plate 130 with liquid 120 switches the camera back to the mode of FIG. 1.

Figure 4:
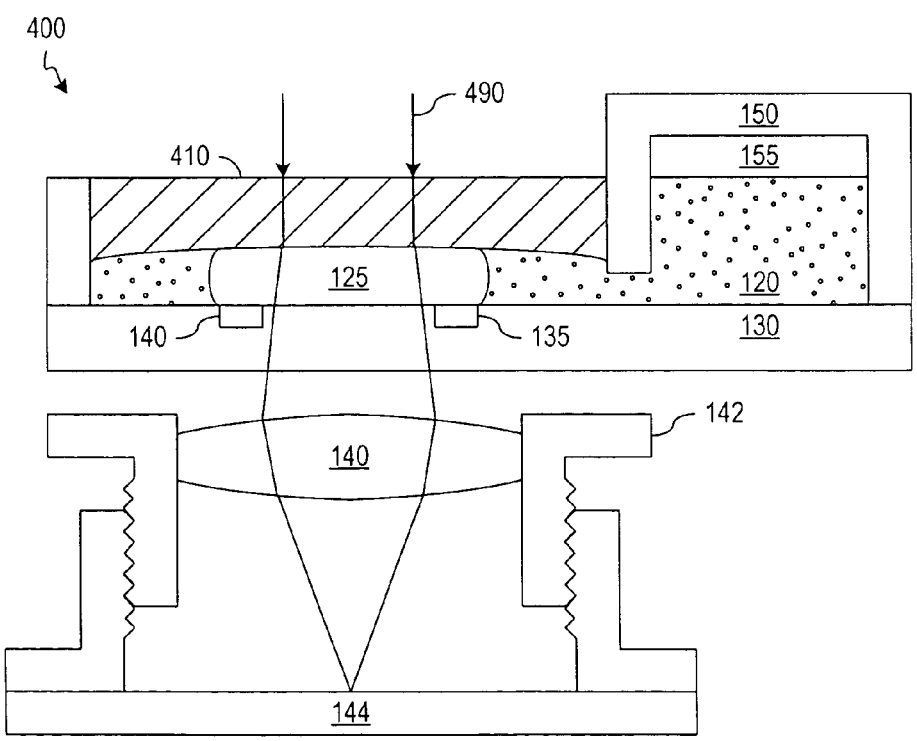
FIG. 4 shows a cross-sectional view of a camera with a lens system in accordance with an embodiment of the invention where a fluid is adjacent to a concave lens surface.

FIG. 4 illustrates a camera 400 in accordance with an embodiment of the invention that includes a liquid 120 between a plano-concave lens 410 and a plate 130. The other elements of camera 400 are substantially the same as described above with reference to camera 100 of FIGS. 1 and 2. Use of a lens 410 having a divergent lens surface adjacent to liquid 120 causes the lens system of camera 400 to have a longer focal length when a bubble 125 is in the optical path of camera 400. Accordingly, camera 400 can have a normal photography mode when a bubble 125 or air gap is between lens 410 and plate 130, and a macro photography mode when liquid 120 is in the optical path between lens 410 and plate 130. An advantage of the concave surface of lens 410 is that the concave surface tends to center bubble 125 on lens 410 and therefore center bubble 125 on the common location of the optical path.

Although the invention has been described with reference to particular embodiments, the description is only an example of the invention's application and should not be taken as a limitation. For example, although the above embodiments employ a liquid or a bubble between a lens and a plate, similar liquid/bubble modes could be implemented between other optical element combinations such as two lenses, and the lens system could include multiple liquid filled gaps that can be operated individually or simultaneously to provide the lens system with a series of different focal lengths. Various other adaptations and combinations of features of the embodiments disclosed are within the scope of the invention as defined by the following claims.

What is claimed is:

1. An optical system comprising:
    a lens;
    an optical element;
    a liquid in a gap between the lens and the optical element, wherein the liquid contacts a curved surface of the lens;
    a heating element on the optical element; and
    a control system operable in a first mode and a second mode, wherein in the first mode, the heating element is off and the liquid is in an optical path through the first lens and the optical element, and in the second mode, the heating element heats the liquid to create a bubble that is in the optical path.

2. The system of claim 1, wherein the lens has a convex side in contact with the liquid.

3. The system of claim 1, wherein the lens has a concave side in contact with the liquid.

4. The system of claim 1, wherein the liquid has a refractive index that is about equal to a refractive index of the lens.

5. The system of claim 1, wherein:
    the optical system comprises a camera lens;
    one of the first mode and the second mode corresponds to a macro photography mode of the camera lens; and
    the other of the first mode and the second mode corresponds to a normal photography mode of the camera lens.

6. The system of claim 1, wherein the optical element comprises a plate having a planar surface in contact with the liquid.

7. The system of claim 6, wherein the heating element is on the planar surface.

8. A method for operating a camera that includes a lens, an optical element, and a liquid that is in a gap between the lens and the optical element and is in contact with a curved surface of the lens, the method comprising:
    capturing a first image that is formed using an optical path through the lens, the liquid, and the optical element;
    heating the liquid to create the bubble in the liquid; and
    capturing a second image that is formed using an optical path through the lens, the bubble, and the optical element.

9. The method of claim 8, wherein the lens has a convex side in contact with the liquid.

10. The method of claim 8, wherein the lens has a concave side in contact with the liquid.

11. The method of claim 8, wherein the liquid has a refractive index that is about equal to a refractive index of the lens.

12. The method of claim 8, wherein:
    one of the first image and the second image corresponds to a photograph taken in a macro photography mode of the camera lens; and
    the other of the first image and the second image corresponds to a photograph taken in a normal photography mode of the camera lens.

* * * * *